US011927906B2

(12) United States Patent
Yamamoto

(10) Patent No.: US 11,927,906 B2
(45) Date of Patent: Mar. 12, 2024

(54) SHEET PROCESSING APPARATUS CAPABLE OF SELECTING SHEET TYPE AND PROCESSING CONDITION SETTING METHOD

(71) Applicant: KYOCERA Document Solutions Inc., Osaka (JP)

(72) Inventor: Takenori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/943,488

(22) Filed: Sep. 13, 2022

(65) Prior Publication Data

US 2023/0078963 A1 Mar. 16, 2023

(30) Foreign Application Priority Data

Sep. 15, 2021 (JP) ................................ 2021-149890

(51) Int. Cl.
*G03G 15/00* (2006.01)

(52) U.S. Cl.
CPC ....... *G03G 15/607* (2013.01); *G03G 15/5025* (2013.01)

(58) Field of Classification Search
CPC ......................... G03G 15/607; G03G 15/5025
See application file for complete search history.

(56) References Cited

U.S. PATENT DOCUMENTS

| | | | | |
|---|---|---|---|---|
| 6,508,465 B1 * | 1/2003 | Endo | B65H 3/5223 | 271/265.04 |
| 8,490,963 B2 * | 7/2013 | Miyahara | G03G 15/6508 | 399/389 |
| 8,908,236 B1 * | 12/2014 | Rudge | H04N 1/00771 | 358/449 |
| 8,970,865 B2 * | 3/2015 | Nakagawa | H04N 1/3935 | 358/1.14 |
| 2012/0027483 A1 * | 2/2012 | Hayashihara | B65H 7/14 | 399/45 |
| 2015/0002863 A1 * | 1/2015 | Kameda | B41J 11/003 | 358/1.2 |

(Continued)

FOREIGN PATENT DOCUMENTS

JP 2015087470 A 5/2015

*Primary Examiner* — David H Banh
(74) *Attorney, Agent, or Firm* — Alleman Hall & Tuttle LLP

(57) ABSTRACT

A sheet processing apparatus includes a sensing processing portion, a determination processing portion, an acquisition processing portion, an acceptance processing portion, and a setting processing portion. The sensing processing portion senses a sheet size. The determination processing portion determines whether the sheet size corresponds to any of a plurality of standard sizes based on a result of the sensing by the sensing processing portion. The acquisition processing portion acquires sheet attribute information that is determined for each sheet type based on a result of the determination by the determination processing portion or the result of the sensing by the sensing processing portion. The acceptance processing portion accepts a selection operation of selecting any of the acquired sheet attribute information. The setting processing portion sets a processing condition of a sheet based on the sheet attribute information selected by the selection operation.

3 Claims, 5 Drawing Sheets

(56) References Cited

U.S. PATENT DOCUMENTS

| | | | | |
|---|---|---|---|---|
| 2015/0269461 | A1* | 9/2015 | Wakai | G06K 15/402<br>358/1.6 |
| 2015/0281492 | A1* | 10/2015 | Mamura | H04N 1/00726<br>358/1.15 |
| 2018/0063347 | A1* | 3/2018 | Conlon | H04N 1/00737 |
| 2019/0327375 | A1* | 10/2019 | Baba | H04N 1/00708 |
| 2021/0295117 | A1* | 9/2021 | Lim | H04N 1/00769 |

* cited by examiner

SHEET PROCESSING APPARATUS CAPABLE OF SELECTING SHEET TYPE AND PROCESSING CONDITION SETTING METHOD

INCORPORATION BY REFERENCE

This application is based upon and claims the benefit of priority from the corresponding Japanese Patent Application No. 2021-149890 filed on Sep. 15, 2021, the entire contents of which are incorporated herein by reference.

BACKGROUND

The present disclosure relates to a sheet processing apparatus and a processing condition setting method executed by the sheet processing apparatus.

In an electrophotographic image forming apparatus, a processing condition of a sheet onto which a toner image is to be transferred is set based on a type of the sheet, the processing condition including a fixing temperature of a fixing device or the like.

For example, pieces of sheet attribute information corresponding to respective types of the sheets are registered in advance in the image forming apparatus. The sheet attribute information is information indicating attributes of the sheet such as a size, weight, thickness, and material of the sheet. Further, in the image forming apparatus, when it is determined that a size of a stored sheet stored in a sheet feed cassette corresponds to one of a plurality of predetermined standard sizes, pieces of sheet attribute information that are narrowed down from the plurality of pieces of sheet attribute information based on the standard size that is determined as corresponding, are displayed as selection candidates. Then, when a user performs an operation of selecting any of the sheet attribute information displayed as the selection candidates in the image forming apparatus, the processing condition is set based on the sheet attribute information selected by the operation.

There is also known an image forming apparatus capable of additionally registering, according to a user operation, the sheet attribute information in which the size of a sheet is expressed by a combination of a vertical length and a horizontal length instead of the standard size.

SUMMARY

A sheet processing apparatus according to an aspect of the present disclosure includes a sheet storing portion, a sensing processing portion, a determination processing portion, an acquisition processing portion, an acceptance processing portion, and a setting processing portion. The sheet storing portion stores sheets. The sensing processing portion senses a length of a stored sheet stored in the sheet storing portion in a sheet conveying direction and a length of the stored sheet in a sheet width direction orthogonal to the sheet conveying direction. The determination processing portion determines whether a size of the stored sheet corresponds to any of a plurality of predetermined standard sizes based on a result of the sensing by the sensing processing portion. The acquisition processing portion acquires, when the determination processing portion determines that the size of the stored sheet corresponds to one of the standard sizes, first sheet attribute information narrowed down from sheet attribute information that is predetermined for each type of the sheets and in which a size out of attributes of the sheets is expressed by any of the standard sizes or a combination of the length in the sheet conveying direction and the length in the sheet width direction, the first sheet attribute information being narrowed down based on the standard size that is determined as corresponding by the determination processing portion, and acquires, when the determination processing portion determines that the size of the stored sheet does not correspond to any of the standard sizes, second sheet attribute information narrowed down from the sheet attribute information based on the result of the sensing by the sensing processing portion. The acceptance processing portion outputs the sheet attribute information acquired by the acquisition processing portion and accepts a selection operation of selecting any of the sheet attribute information. The setting processing portion sets a processing condition of the stored sheet based on the sheet attribute information selected by the selection operation.

A processing condition setting method according to another aspect of the present disclosure is executed by a sheet processing apparatus including a sheet storing portion that stores sheets and includes a sensing step, a determination step, an acquisition step, an acceptance step, and a setting step. The sensing step includes sensing a length of a stored sheet stored in the sheet storing portion in a sheet conveying direction and a length of the stored sheet in a sheet width direction orthogonal to the sheet conveying direction. The determination step includes determining whether a size of the stored sheet corresponds to any of a plurality of predetermined standard sizes based on a result of the sensing in the sensing step. The acquisition step includes acquiring, when it is determined in the determination step that the size of the stored sheet corresponds to one of the standard sizes, first sheet attribute information narrowed down from sheet attribute information that is predetermined for each type of the sheets and in which a size out of attributes of the sheets is expressed by any of the standard sizes or a combination of the length in the sheet conveying direction and the length in the sheet width direction, the first sheet attribute information being narrowed down based on the standard size that is determined as corresponding in the determination step, and acquiring, when it is determined in the determination step that the size of the stored sheet does not correspond to any of the standard sizes, second sheet attribute information narrowed down from the sheet attribute information based on the result of the sensing in the sensing step. The acceptance step includes outputting the sheet attribute information acquired in the acquisition step and accepting a selection operation of selecting any of the sheet attribute information. The setting step includes setting a processing condition of the stored sheet based on the sheet attribute information selected by the selection operation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

[Configuration of Image Forming Apparatus 100]

Figure 1:
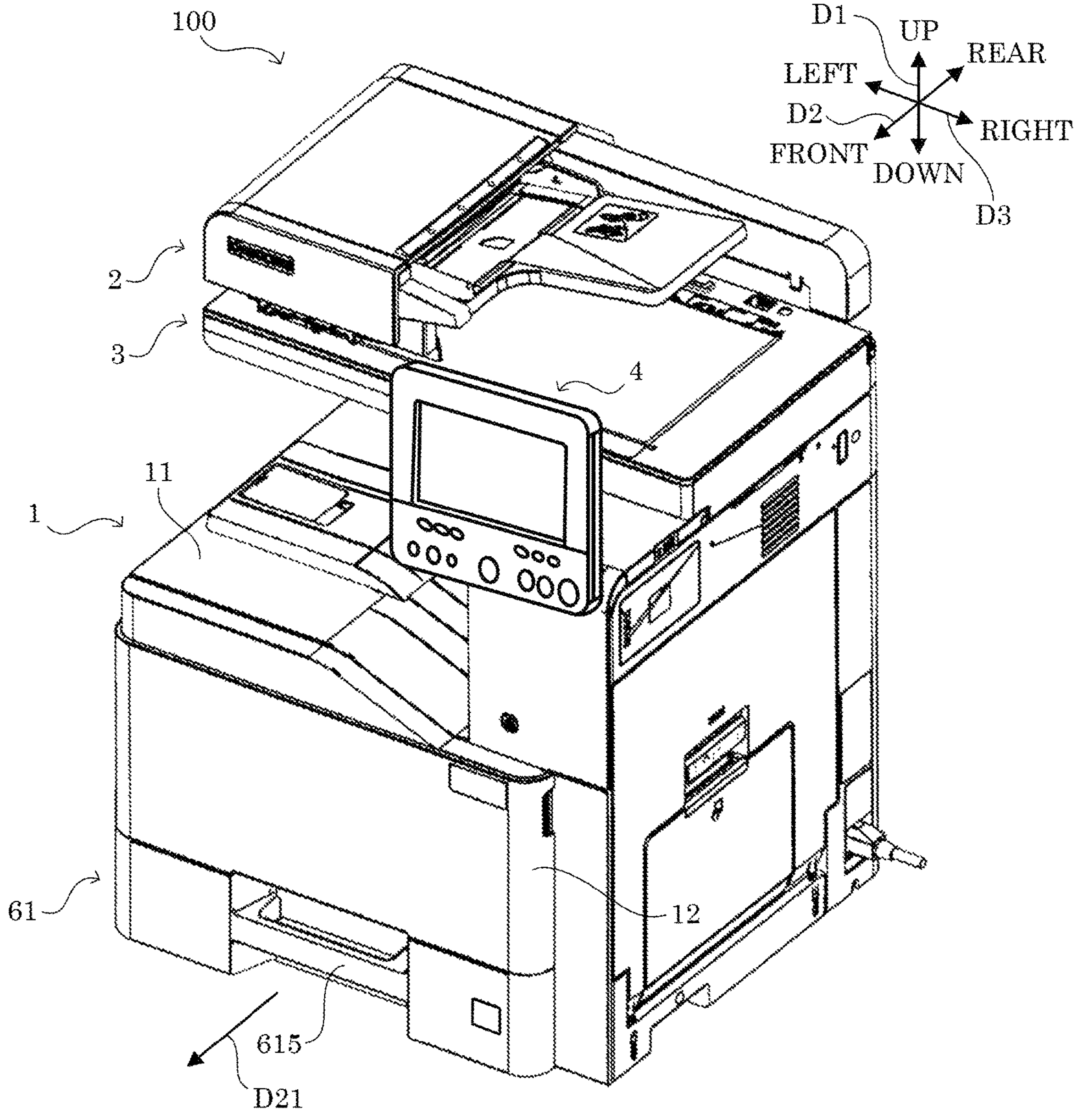
FIG. 1 is a diagram showing a configuration of an image forming apparatus according to an embodiment of the present disclosure.
Figure 2:
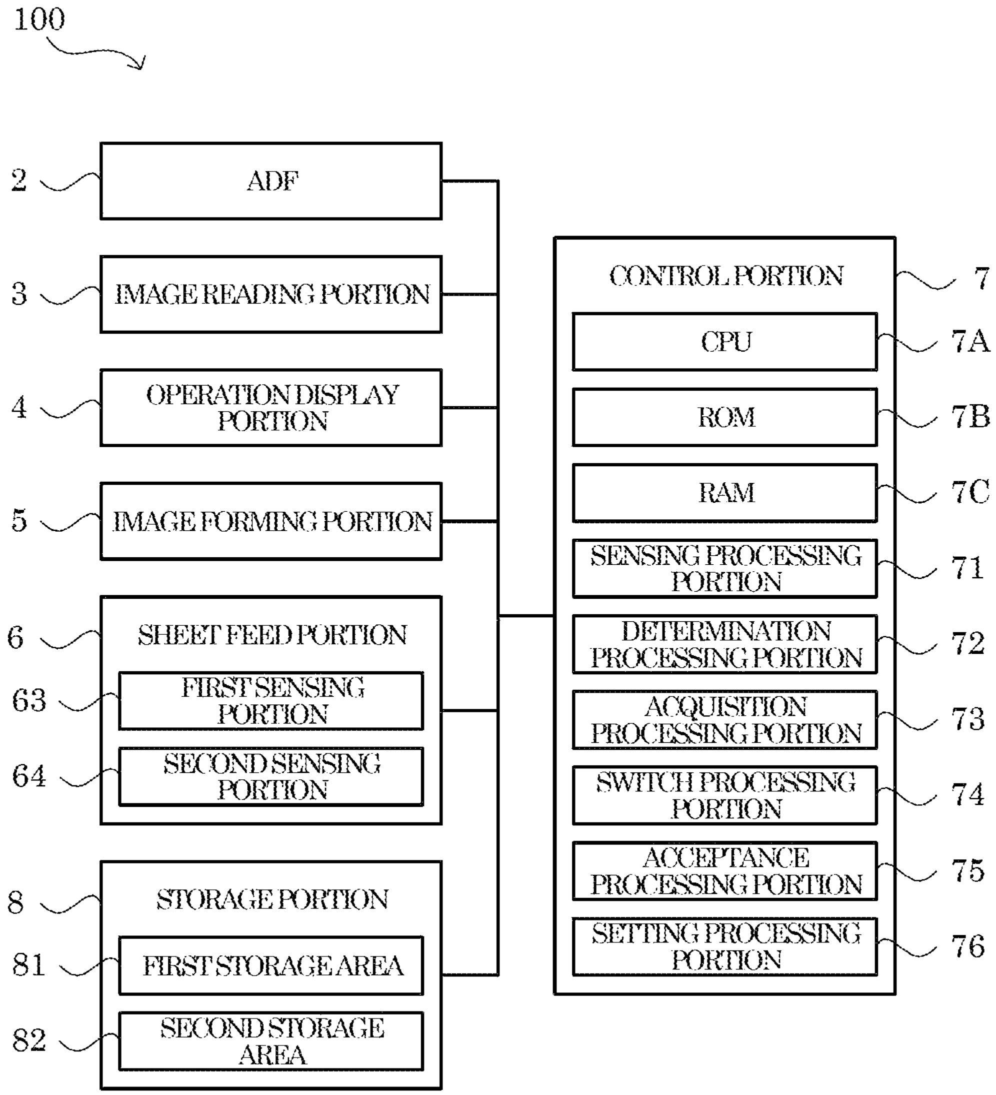
FIG. 2 is a diagram showing a system configuration of the image forming apparatus according to the embodiment of the present disclosure.

First, a configuration of an image forming apparatus 100 according to the embodiment of the present disclosure will be described with reference to FIG. 1 to FIG. 4. Here, FIG. 1 is a perspective view showing an external configuration of the image forming apparatus 100. Further, FIG. 2 is a block diagram showing a system configuration of the image forming apparatus 100. Furthermore, FIG. 3 is a cross-sectional view showing an internal configuration of a housing 1, and FIG. 4 is a perspective view showing a configuration of a sheet feed cassette 61.

It is noted that for convenience of explanation, a vertical direction in a state where the image forming apparatus 100 is usably set (state shown in FIG. 1) is defined as an up-down direction D1. In addition, a front-rear direction D2 is defined in a state where a surface of the image forming apparatus 100 on a sheet front-left side shown in FIG. 1 is assumed to be a front surface (front side). Further, a left-right direction D3 is defined based on the front surface of the image forming apparatus 100 in the setting state described above.

The image forming apparatus 100 is a multifunction peripheral that includes a plurality of functions such as a facsimile function and a copying function in addition to a scanning function of reading an image of a document sheet and a printing function of forming an image on a sheet based on image data. The image forming apparatus 100 is an example of a sheet processing apparatus according to the present disclosure. It is noted that the present disclosure may also be applied to image forming apparatuses such as a printer, a facsimile apparatus, and a copying machine. Furthermore, the present disclosure may also be applied to a sheet processing apparatus that executes processing different from image forming processing, such as sheet cutting processing.

Figure 3:
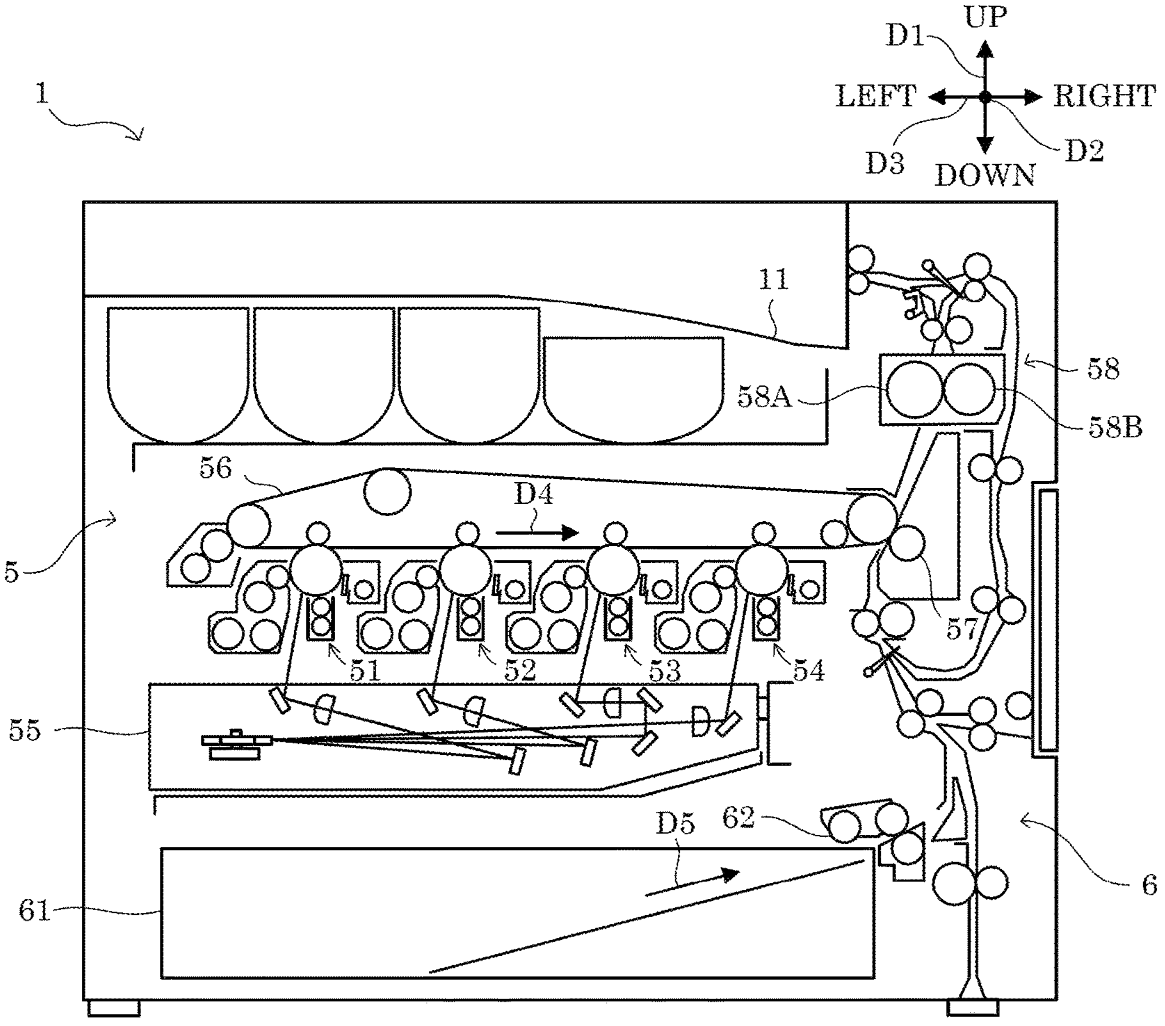
FIG. 3 is a diagram showing an internal configuration of a housing in the image forming apparatus according to the embodiment of the present disclosure.
Figure 4:
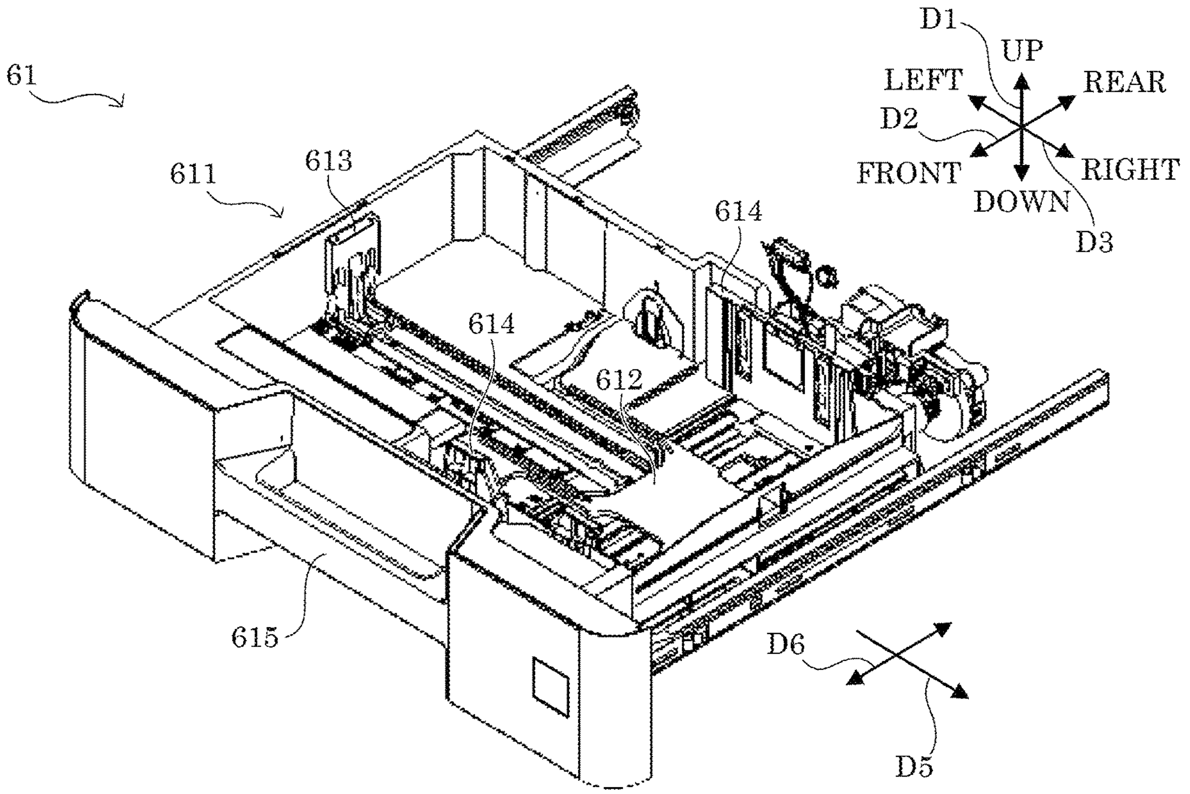
FIG. 4 is a diagram showing a configuration of a sheet feed cassette in the image forming apparatus according to the embodiment of the present disclosure.
Figure 5:
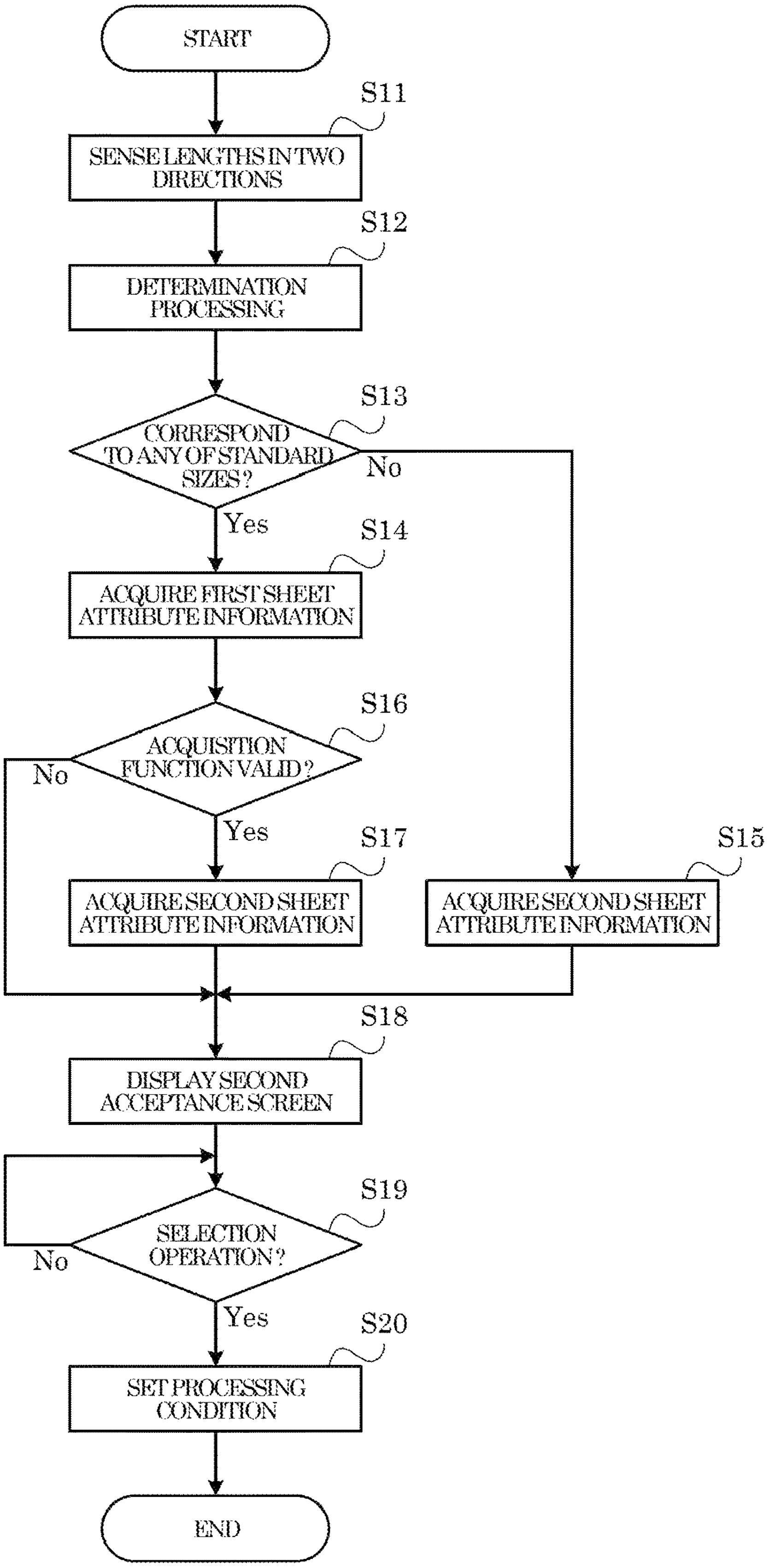
FIG. 5 is a flowchart showing an example of processing condition setting processing that is executed in the image forming apparatus according to the embodiment of the present disclosure.

As shown in FIG. 1 to FIG. 3, the image forming apparatus 100 includes the housing 1, an ADF 2, an image reading portion 3, an operation display portion 4, an image forming portion 5, a sheet feed portion 6, a control portion 7, and a storage portion 8.

As shown in FIG. 3, the housing 1 accommodates the image forming portion 5 and the sheet feed portion 6. The housing 1 is formed in a substantially rectangular parallelepiped shape. As shown in FIG. 1, the ADF 2 and the image reading portion 3 are provided above the housing 1. Further, the operation display portion 4 is provided on a front side of the housing 1.

As shown in FIG. 1 and FIG. 3, a sheet reception portion 11 is provided at an upper portion of the housing 1. A sheet on which an image is formed by the image forming portion 5 is discharged to the sheet reception portion 11. In addition, a front cover 12 is provided at a front portion of the housing 1 as shown in FIG. 1. The front cover 12 forms a part of the front surface of the housing 1 while being openable and closable with respect to the housing 1. In addition, an opening portion is provided below the front cover 12 in the housing 1. The opening portion forms an opening through which the sheet feed cassette 61 is inserted and drawn out.

The ADF 2 conveys document sheets to be read by the image reading portion 3. Specifically, the ADF 2 includes a document sheet setting portion, a plurality of document sheet conveying rollers, a document sheet holder, and a document sheet discharge portion. The ADF 2 conveys a document sheet placed on the document sheet setting portion to the document sheet discharge portion via an image reading position of the image reading portion 3.

The image reading portion 3 realizes the scanning function. Specifically, the image reading portion 3 includes a document sheet table, a light source, a plurality of mirrors, an optical lens, and a CCD. The image reading portion 3 reads, from a document sheet placed on the document sheet table or a document sheet conveyed by the ADF 2, an image of the document sheet.

The operation display portion 4 is a user interface of the image forming apparatus 100. The operation display portion 4 includes a display portion such as a liquid crystal display that displays various types of information in response to control instructions from the control portion 7 and an operation portion such as operation keys and a touch panel that is used to input various types of information to the control portion 7 according to user operations.

The image forming portion 5 realizes the printing function. Specifically, the image forming portion 5 forms an image on a sheet supplied from the sheet feed portion 6 by electrophotography. It is noted that the present disclosure may also be applied to an image forming apparatus that forms an image on a sheet by an ink-jet method or the like as an image forming method different from electrophotography.

As shown in FIG. 3, the image forming portion 5 includes a plurality of image forming units 51 to 54 respectively corresponding to Y (yellow), M (magenta), C (cyan), and K (black), a laser scanning unit (LSU) 55, an intermediate transfer belt 56, a secondary transfer belt 57, and a fixing device 58.

The image forming units 51 to 54 are arranged along a belt rotation direction D4 (see FIG. 3) of the intermediate transfer belt 56. The image forming unit 51 forms a toner image corresponding to Y (yellow). The image forming unit 52 forms a toner image corresponding to M (magenta). The image forming unit 53 forms a toner image corresponding to C (cyan). The image forming unit 54 forms a toner image corresponding to K (black).

The image forming unit 51 includes a photoconductor drum and a charging device, a developing device, a primary transfer roller, and a cleaning device that are provided in correspondence with the photoconductor drum. Further, the image forming units 52 to 54 have configurations similar to that of the image forming unit 51.

The photoconductor drum carries a toner image. The charging device charges a surface of the photoconductor drum to a predetermined potential. Laser light based on image data, which is emitted from the laser scanning unit 55, is irradiated onto the surface of the photoconductor drum charged by the charging device. Thus, an electrostatic latent image based on the image data is formed on the surface of the photoconductor drum. The developing device develops the electrostatic latent image formed on the surface of the photoconductor drum using developer including toner. The primary transfer roller transfers the toner image developed by the developing device onto the intermediate transfer belt 56. The cleaning device cleans the surface of the photoconductor drum after the toner image is transferred by the primary transfer roller.

The intermediate transfer belt 56 runs above the photoconductor drum of each of the image forming units 51 to 54. The toner images of the respective colors formed by the respective photoconductor drums are transferred onto the intermediate transfer belt 56 while overlapping with one another.

The secondary transfer belt 57 transfers the toner image on the intermediate transfer belt 56 onto a sheet supplied from the sheet feed portion 6.

The fixing device 58 fixes the toner image transferred onto the sheet by the secondary transfer belt 57 to the sheet. As shown in FIG. 3, the fixing device 58 includes a fixing roller 58A and a pressure roller 58B. The fixing roller 58A is heated to a predetermined fixing temperature. The pressure roller 58B is biased toward the fixing roller 58A and forms a fixing nip portion with the fixing roller 58A. In the fixing device 58, a sheet that passes the fixing nip portion is heated and pressurized by the fixing roller 58A and the pressure roller 58B. Thus, the toner image transferred onto the sheet is fixed to the sheet. The sheet to which the toner image is fixed by the fixing device 58 is discharged to the sheet reception portion 11.

The sheet feed portion 6 supplies sheets to the image forming portion 5. As shown in FIG. 3, the sheet feed portion 6 includes the sheet feed cassette 61, a pickup roller 62, and a plurality of sheet conveying rollers. In addition, as shown in FIG. 2, the sheet feed portion 6 includes a first sensing portion 63 and a second sensing portion 64.

The sheet feed cassette 61 stores sheets to be supplied to the image forming portion 5. The sheet feed cassette 61 is an example of a sheet storing portion according to the present disclosure. It is noted that in descriptions below, a sheet stored in the sheet feed cassette 61 may be referred to as "stored sheet".

As shown in FIG. 4, the sheet feed cassette 61 includes a storing portion 611, a lift member 612, a rear end cursor 613, a pair of side cursors 614, an a holding portion 615.

The storing portion 611 defines a sheet storing space. As shown in FIG. 4, the storing portion 611 is formed in an upwardly-opened box shape.

The sheet feed cassette 61 can be drawn out from the opening formed in the opening portion of the housing 1 in a front direction D21 (see FIG. 1). Specifically, the sheet feed cassette 61 is supported while being slidable in the front-rear direction D2 inside the housing 1. For example, a pair of rails elongated in the front-rear direction D2 is provided inside the housing 1. In addition, the storing portion 611 includes a pair of rail guides that engages with the pair of rails to enable the sheet feed cassette 61 to slidably move in the front-rear direction D2. Thus, the sheet feed cassette 61 can be drawn out in the front direction D21 from a state where it is set in the image forming apparatus 100. It is noted that a movement mechanism of the sheet feed cassette 61 may be a mechanism other than a rail supporting mechanism constituted of the pair of rails and the pair of rail guides.

The lift member 612 can be raised and lowered in the up-down direction D1 at a bottom portion of the storing portion 611. The lift member 612 lifts a sheaf of sheets stored in the sheet feed cassette 61 to a contact position at which the sheaf of sheets come into contact with the pickup roller 62.

The rear end cursor 613 is provided while being movable in the left-right direction D3 at the bottom portion of the storing portion 611. The rear end cursor 613 is brought into contact with rear end portions of stored sheets in a sheet conveying direction D5 (see FIG. 4) and adjusts positions of the stored sheets in the left-right direction D3.

The pair of side cursors 614 is provided while being movable in the front-rear direction D2 at the bottom portion of the storing portion 611. The pair of side cursors 614 is brought into contact with both end portions of the stored sheets in a sheet width direction D6 (see FIG. 4) and adjusts the positions of the stored sheets in the front-rear direction D2.

The holding portion 615 is provided at a front end portion of the sheet feed cassette 61. The holding portion 615 is used to insert and draw out the sheet feed cassette 61 into/from the housing 1.

Of the sheaf of sheets lifted to the contact position by the lift member 612, the pickup roller 62 conveys an uppermost sheet in the sheet conveying direction D5 (see FIG. 3 and FIG. 4). The sheet conveyed by the pickup roller 62 is conveyed to a toner image transfer position of the secondary transfer belt 57 by the plurality of sheet conveying rollers.

The first sensing portion 63 senses a length of the stored sheet in the sheet conveying direction D5 (see FIG. 4). For example, the first sensing portion 63 is an electric circuit that includes a first variable resistor whose electrical resistance varies depending on an arrangement position of the rear end cursor 613 in the storing portion 611, and is capable of outputting a first electrical signal corresponding to the electrical resistance of the first variable resistor.

The second sensing portion 64 senses a length of the stored sheet in the sheet width direction D6 (see FIG. 4). For example, the second sensing portion 64 is an electric circuit that includes a second variable resistor whose electrical resistance varies depending on an interval between the pair of side cursors 614, and is capable of outputting a second electrical signal corresponding to the electrical resistance of the second variable resistor.

The control portion 7 collectively controls the image forming apparatus 100. As shown in FIG. 2, the control portion 7 includes a CPU 7A, a ROM 7B, and a RAM 7C.

The CPU 7A is a processor that executes various types of calculation processing. The ROM 7B is a nonvolatile storage device in which information such as control programs for causing the CPU 7A to execute various types of processing is stored in advance. The RAM 7C is a volatile or nonvolatile storage device that is used as a temporary storage memory (working area) for the various types of processing to be executed by the CPU 7A. The CPU 7A executes the various control programs stored in advance in the ROM 7B to thus collectively control the image forming apparatus 100.

The storage portion 8 is a nonvolatile storage device. For example, the storage portion 8 is a storage device such as a nonvolatile memory including a flash memory, an EEPROM, and the like, a solid state drive (SSD), and a hard disk drive (HDD).

In the storage portion 8, sheet attribute information that is predetermined for each type of sheets stored in the sheet feed cassette 61 is stored in advance. The sheet attribute information is information indicating sheet attributes such as a size, weight, thickness, and material of a sheet. In addition, the sheet attribute information is information in which the size out of the sheet attributes is expressed by any of the plurality of predetermined standard sizes or a combination of the length in the sheet conveying direction D5 and the length in the sheet width direction D6. For example, the standard sizes are an A3 size of portrait orientation, an A4 size of portrait orientation, an A4 size of landscape orientation, an A5 size of portrait orientation, and an A5 size of landscape orientation.

For example, the storage portion 8 includes a first storage area 81 and a second storage area 82 shown in FIG. 2. Of the sheet attribute information, initial registration information which is the sheet attribute information in which the sheet size is expressed by any of the plurality of standard sizes is stored in the first storage area 81. The initial registration information is stored in advance in the first storage area 81 before shipment of the image forming apparatus 100. Of the sheet attribute information, additional registration information which is the sheet attribute information in which the sheet size is expressed by the combination of the length in the sheet conveying direction D5 and the length in the sheet width direction D6 is stored in the second storage area 82. The additional registration information is stored in the second storage area 82 according to a user operation after the shipment of the image forming apparatus 100.

For example, in response to a predetermined first display operation made in the operation display portion 4, the control portion 7 controls the operation display portion 4 to display an attribute input screen that is used to input a sheet attribute. The sheet attribute including the length in the sheet conveying direction D5 and the length in the sheet width direction D6 can be input in the attribute input screen. When a confirmation operation of confirming an input content is made in the attribute input screen, the control portion 7 generates the additional registration information corresponding to the input content of the attribute input screen and stores the generated additional registration information in the second storage area 82. Thus, the user can register a sheet of an atypical size whose sheet size is expressed by the combination of the length in the sheet conveying direction D5 and the length in the sheet width direction D6 in the image forming apparatus 100.

In the image forming apparatus 100, a processing condition of the stored sheet is set based on the sheet attribute information selected by the user out of the sheet attribute information stored in the storage portion 8. The processing condition includes a conveying condition of the stored sheet and an image forming condition of the image forming portion 5 with respect to the stored sheet. Specifically, the conveying condition is a conveying speed of the stored sheet, and the image forming condition is the fixing temperature.

It is noted that the conveying condition may be a conveying interval of the stored sheets. In addition, the image forming condition may be a secondary transfer current supplied to the secondary transfer belt 57 or a contact pressure between the fixing roller 58A and the pressure roller 58B. In addition, the processing condition may be either one of the conveying condition and the image forming condition.

The setting of the processing condition is executed by the control portion 7. Hereinafter, a configuration of the control portion 7 will be described in more detail with reference to FIG. 2.

[Configuration of Control Portion 7]

As shown in FIG. 2, the control portion 7 includes a sensing processing portion 71, a determination processing portion 72, an acquisition processing portion 73, a switch processing portion 74, an acceptance processing portion 75, and a setting processing portion 76.

Specifically, processing condition setting programs for causing the CPU 7A to function as the respective portions described above are stored in advance in the ROM 7B of the control portion 7. By executing the processing condition setting programs stored in the ROM 7B, the CPU 7A functions as the sensing processing portion 71, the determination processing portion 72, the acquisition processing portion 73, the switch processing portion 74, the acceptance processing portion 75, and the setting processing portion 76.

It is noted that the processing condition setting programs may be recorded onto a computer-readable recording medium such as a CD, a DVD, and a flash memory so that the processing condition setting programs are read from the recording medium to be stored in the storage portion 8. In addition, a part or all of the sensing processing portion 71, the determination processing portion 72, the acquisition processing portion 73, the switch processing portion 74, the acceptance processing portion 75, and the setting processing portion 76 may be configured as an electronic circuit such as an integrated circuit (ASIC).

The sensing processing portion 71 senses the length of the stored sheet in the sheet conveying direction D5 (see FIG. 4) and the length thereof in the sheet width direction D6 (see FIG. 4) orthogonal to the sheet conveying direction D5.

For example, the sensing processing portion 71 senses the length of the stored sheet in the sheet conveying direction D5 based on the first electrical signal output from the first sensing portion 63. Further, the sensing processing portion 71 senses the length of the stored sheet in the sheet width direction D6 based on the second electrical signal output from the second sensing portion 64.

The determination processing portion 72 determines whether a size of the stored sheet corresponds to any of the plurality of standard sizes based on a result of the sensing by the sensing processing portion 71.

For example, when the result of the sensing by the sensing processing portion 71 satisfies a determination condition corresponding to the standard size as a determination target out of the plurality of standard sizes, the determination processing portion 72 determines that the size of the stored sheet corresponds to the standard size. The determination condition means that a difference between the length in the sheet conveying direction D5 sensed by the sensing processing portion 71 and a length of the determination target standard size in the sheet conveying direction D5 falls within a first allowable range, and a difference between the length in the sheet width direction D6 sensed by the sensing processing portion 71 and a length of the determination target standard size in the sheet width direction D6 falls within a second allowable range. The first allowable range and the second allowable range may be set for each of the standard sizes or may be set in common for all of the standard sizes. Alternatively, the first allowable range and the second allowable range may be set arbitrarily in accordance with a predetermined first setting operation.

Meanwhile, in a conventional image forming apparatus, when determined that the size of the stored sheet corresponds to one of the plurality of standard sizes, the sheet attribute information that is narrowed down from the plurality of pieces of sheet attribute information based on the standard size that is determined as corresponding, is displayed as a selection candidate. Also in the conventional image forming apparatus, when a user operation of selecting any of the sheet attribute information displayed as the selection candidates is made, the processing condition is set based on the sheet attribute information selected by the operation.

Here, in the conventional image forming apparatus, when the size of the stored sheet is the atypical size, it is determined that the size of the stored sheet does not correspond to any of the plurality of standard sizes. In this case, in the conventional image forming apparatus, narrowing down of the sheet attribute information to be displayed as the selection candidate is not carried out, and all pieces of the sheet attribute information registered in the apparatus are displayed as the selection candidates. Therefore, the user is required to take time and effort to find the sheet attribute information corresponding to a desired sheet type from all pieces of the sheet attribute information displayed as the selection candidates.

In contrast, in the image forming apparatus 100 according to the embodiment of the present disclosure, time and effort of the user in selecting the sheet type can be reduced as will be described below.

When the determination processing portion 72 determines that the size of the stored sheet corresponds to one of the standard sizes, the acquisition processing portion 73 acquires first sheet attribute information that is narrowed down from the sheet attribute information based on the standard size that has been determined as corresponding by the determination processing portion 72.

Specifically, the first sheet attribute information is the initial registration information that matches the standard size to which the sheet size has been determined to correspond by the determination processing portion 72 out of the initial registration information.

Further, when the determination processing portion 72 determines that the size of the stored sheet does not correspond to any of the standard sizes, the acquisition processing portion 73 acquires second sheet attribute information that is narrowed down from the sheet attribute information based on a result of the sensing by the sensing processing portion 71.

Specifically, of the additional registration information, the second sheet attribute information is the additional registration information in which the length of the sheet in the sheet conveying direction D5 satisfies a first condition, and the length of the sheet in the sheet width direction D6 satisfies a second condition, wherein the first condition is based on the length of the stored sheet in the sheet conveying direction D5, that has been sensed by the sensing processing portion 71, and the second condition is based on the length of the stored sheet in the sheet width direction D6, that has been sensed by the sensing processing portion 71. The first condition means that a difference from the length of the stored sheet in the sheet conveying direction D5, that has been sensed by the sensing processing portion 71, falls within a predetermined third allowable range. In addition, the second condition means that a difference from the length of the stored sheet in the sheet width direction D6, that has been sensed by the sensing processing portion 71, falls within a predetermined fourth allowable range. The third allowable range and the fourth allowable range may be set arbitrarily according to a predetermined second setting operation.

Further, the acquisition processing portion 73 is capable of acquiring the second sheet attribute information together with the first sheet attribute information when the determination processing portion 72 determines that the size of the stored sheet corresponds to one of the standard sizes.

The switch processing portion 74 switches, according to a predetermined switch operation, an acquisition function of the acquisition processing portion 73 to acquire the second sheet attribute information when determined that the size of the stored sheet corresponds to one of the standard sizes, between valid and invalid.

For example, in response to a predetermined second display operation, the switch processing portion 74 causes the operation display portion 4 to display a first acceptance screen that is used to accept the switch operation. When the switch operation is accepted in the first acceptance screen, the switch processing portion 74 switches the setting of the acquisition function from valid to invalid or from invalid to valid.

Here, when the determination processing portion 72 determines that the size of the stored sheet corresponds to one of the standard sizes and the acquisition function is valid, the acquisition processing portion 73 acquires the second sheet attribute information. On the other hand, when the determination processing portion 72 determines that the size of the stored sheet corresponds to one of the standard sizes but the acquisition function is invalid, the acquisition processing portion 73 does not acquire the second sheet attribute information.

It is noted that the acquisition processing portion 73 may also acquire the second sheet attribute information irrespective of validity/invalidity of the acquisition function when the determination processing portion 72 determines that the size of the stored sheet corresponds to one of the standard sizes. Alternatively, the acquisition processing portion 73 does not need to acquire the second sheet attribute information irrespective of validity/invalidity of the acquisition function when the determination processing portion 72 determines that the size of the stored sheet corresponds to one of the standard sizes. In these cases, the control portion 7 does not need to include the switch processing portion 74.

The acceptance processing portion 75 outputs the sheet attribute information acquired by the acquisition processing portion 73 and accepts a selection operation of selecting any of the sheet attribute information.

For example, the acceptance processing portion 75 causes the operation display portion 4 to display a second acceptance screen that is used to accept the selection operation. One or a plurality of pieces of sheet attribute information acquired by the acquisition processing portion 73 is/are displayed in a selectable manner. For example, the selection operation is a tap operation with respect to a display area of any of the sheet attribute information in the second acceptance screen.

It is noted that the acceptance processing portion 75 may output the sheet attribute information acquired by the acquisition processing portion 73 in an output mode different from display, such as audio notification.

The setting processing portion 76 sets the processing condition based on the sheet attribute information selected by the selection operation.

For example, when the selection operation is accepted in the second acceptance screen, the setting processing portion 76 sets the conveying speed of the stored sheet and the fixing temperature based on the sheet attribute information selected by the selection operation.

[Processing Condition Setting Processing]

Hereinafter, a processing condition setting method according to the present disclosure will be described along with an example of procedures of processing condition setting processing executed by the control portion 7 in the image forming apparatus 100. Here, Step S11, Step S12, . . . each represent a number of a processing procedure (step) executed by the control portion 7. The processing condition setting processing is executed when a sensor (not shown) senses that the sheet feed cassette 61 is set in the housing 1. It is noted that the processing condition setting processing may be executed when power of the image forming apparatus 100 is turned on or when a user operation that instructs execution of the processing condition setting processing is made.

<Step S11>

First, in Step S11, the control portion 7 senses the lengths of the stored sheet in two directions, that is, the sheet conveying direction D5 (see FIG. 4) and the sheet width direction D6 (see FIG. 4). Here, the processing of Step S11 is an example of a sensing step of the present disclosure and is executed by the sensing processing portion 71 of the control portion 7.

Specifically, the control portion 7 senses the length of the stored sheet in the sheet conveying direction D5 based on the first electrical signal output from the first sensing portion 63. In addition, the control portion 7 senses the length of the stored sheet in the sheet width direction D6 based on the second electrical signal output from the second sensing portion 64.

<Step S12>

In Step S12, the control portion 7 executes determination processing for determining whether the size of the stored sheet corresponds to any of the plurality of standard sizes based on the sensing result of Step S11. Here, the processing of Step S12 is an example of a determination step of the present disclosure and is executed by the determination processing portion 72 of the control portion 7.

Specifically, in the determination processing, it is determined, for each of the standard sizes, whether the sensing result of Step S11 satisfies the determination condition corresponding to the standard size. Then, when determined that, for any of the standard sizes, the sensing result of Step S11 satisfies the determination condition corresponding to the standard size, it is determined that the size of the stored sheet corresponds to one of the plurality of standard sizes. On the other hand, when determined that the sensing result of Step S11 does not satisfy the determination condition corresponding to the standard size for any of the standard sizes, it is determined that the size of the stored sheet does not correspond to any of the plurality of standard sizes.

<Step S13>

In Step S13, the control portion 7 bifurcates the processing based on the result of the determination processing executed in Step S12. Specifically, when it is determined that the size of the stored sheet corresponds to one of the plurality of standard sizes in the determination processing (Yes in S13), the control portion 7 advances the processing to Step S14. On the other hand, when it is determined that the size of the stored sheet does not correspond to any of the plurality of standard sizes in the determination processing (No in S13), the control portion 7 advances the processing to Step S15.

<Step S14>

In Step S14, the control portion 7 acquires the first sheet attribute information based on the standard size that has been determined as corresponding by the determination processing. Here, the processing of Step S14 is an example of an acquisition step of the present disclosure and is executed by the acquisition processing portion 73 of the control portion 7.

Specifically, of the initial registration information stored in the first storage area 81 of the storage portion 8, the control portion 7 acquires, as the first sheet attribute information, the initial registration information that matches the standard size to which the sheet size has been determined to correspond by the determination processing.

<Step S15>

In Step S15, the control portion 7 acquires the second sheet attribute information based on the sensing result of Step S11. Here, the processing of Step S15 is an example of the acquisition step of the present disclosure and is executed by the acquisition processing portion 73 of the control portion 7.

Specifically, of the additional registration information stored in the second storage area 82 of the storage portion 8, the control portion 7 acquires, as the second sheet attribute information, the additional registration information in which the length of the sheet in the sheet conveying direction D5 satisfies the first condition and the length of the sheet in the sheet width direction D6 satisfies the second condition, wherein the first condition is based on the length of the stored sheet in the sheet conveying direction D5, that has been sensed in Step S11, and the second condition is based on the length of the stored sheet in the sheet width direction D6, that has been sensed in Step S11.

<Step S16>

In Step S16, the control portion 7 determines whether the acquisition function is valid.

Here, when determined that the acquisition function is valid (Yes in S16), the control portion 7 advances the processing to Step S17. When determined that the acquisition function is invalid (No in S16), the control portion 7 advances the processing to Step S18.

<Step S17>

In Step S17, the control portion 7 acquires the second sheet attribute information similar to Step S15. Here, the processing of Step S17 is executed by the acquisition processing portion 73 of the control portion 7.

<Step S18>

In Step S18, the control portion 7 controls the operation display portion 4 to display the second acceptance screen. Here, the processing of Step S18 is an example of an acceptance step of the present disclosure and is executed by the acceptance processing portion 75 of the control portion 7.

Here, when the processing of Step S14 is executed but the processing of Step S17 is not executed, the first sheet attribute information acquired in Step S14 is displayed in a selectable manner. In other words, the sheet attribute information narrowed down from the sheet attribute information registered in the image forming apparatus 100 based on the determined size of the stored sheet (any of the standard sizes) is displayed in the selectable manner.

In addition, when the processing of Step S15 is executed, the second sheet attribute information acquired in Step S15 is displayed in the selectable manner. In other words, the sheet attribute information narrowed down from the sheet attribute information registered in the image forming apparatus 100 based on sensing values of the lengths of the stored sheet in the two directions, that is, a vertical direction (sheet conveying direction D5) and a horizontal direction (sheet width direction D6), is displayed in the selectable manner. It is noted that when the number of pieces of second sheet attribute information acquired in Step S15 is zero, the control portion 7 may cause the attribute input screen to be displayed in place of the second acceptance screen so as to accept a registration operation of the additional registration information. In addition, when the number of pieces of second sheet attribute information acquired in Step S15 is zero but the second sheet attribute information in which the lengths in the two directions are opposite to those of the stored sheet exists, the control portion 7 may notify to that effect.

Further, when both of the processing of Step S14 and Step S17 are executed, the first sheet attribute information acquired in Step S14 and the second sheet attribute information acquired in Step S17 are both displayed in the selectable manner. In other words, the sheet attribute information narrowed down from the sheet attribute information registered in the image forming apparatus 100 based on the determined size of the stored sheet and the sheet attribute information narrowed down from the sheet attribute information registered in the image forming apparatus 100 based on the sensing values of the lengths of the stored sheet in the two directions, that is, the vertical direction and the horizontal direction, are both displayed in the selectable manner. In this case, the control portion 7 may display the first sheet attribute information and the second sheet attribute information in a distinguishable mode. For example, the control portion 7 may display the first sheet attribute information in a display color different from that of the second sheet attribute information.

It is noted that according to a predetermined display switch operation made in the second acceptance screen, the control portion 7 may display all pieces of the sheet attribute information in the selectable manner in place of the display of either one or both of the first sheet attribute information and the second sheet attribute information.

<Step S19>

In Step S19, the control portion 7 determines whether the selection operation has been accepted in the second acceptance screen displayed in Step S18.

Specifically, when a tap operation is made with respect to a display area of any of the sheet attribute information in the second acceptance screen, the control portion 7 determines that the selection operation of selecting the sheet attribute information corresponding to the tapped display area has been accepted.

Here, upon determining that the selection operation has been accepted in the second acceptance screen (Yes in S19), the control portion 7 advances the processing to Step S20. Alternatively, upon determining that the selection operation has not been accepted in the second acceptance screen (No in S19), the control portion 7 stands by until the selection operation is accepted in Step S19.

<Step S20>

In Step S20, the control portion 7 sets the processing condition based on the sheet attribute information selected by the selection operation. Here, the processing of Step S20 is an example of a setting step of the present disclosure and is executed by the setting processing portion 76 of the control portion 7.

Specifically, the control portion 7 sets the conveying speed of the stored sheet and the fixing temperature based on the sheet attribute information selected by the selection operation.

As described above, in the image forming apparatus 100, when determined that the size of the stored sheet corresponds to one of the standard sizes, the first sheet attribute information narrowed down from the sheet attribute information based on the determined size of the stored sheet is displayed in the selectable manner. Moreover, in the image forming apparatus 100, when determined that the size of the stored sheet does not correspond to any of the standard sizes, the second sheet attribute information narrowed down from the sheet attribute information based on the sensing values of the lengths of the stored sheet in the two directions, that is, the vertical direction and the horizontal direction, is displayed in the selectable manner. In other words, in the image forming apparatus 100, even when the size of the stored sheet is the atypical size, narrowing down of the sheet attribute information to be displayed as the selection candidates is carried out, and only the sheet attribute information in which the size matches or is approximate to the size of the stored sheet is displayed in the selectable manner. Thus, it becomes possible to reduce, when the size of the stored sheet is the atypical size, time and effort of the user in selecting the sheet type (the sheet attribute information) as compared to a configuration in which all pieces of the registered sheet attribute information are displayed as the selection candidates.

In addition, in the image forming apparatus 100, when determined that the size of the stored sheet corresponds to one of the standard sizes and the acquisition function is valid, the second sheet attribute information is displayed in the selectable manner in addition to the first sheet attribute information. Thus, even in a case where the size of the stored sheet is the atypical size but the size of the stored sheet is erroneously determined to be one of the standard sizes since the size is close to the standard size, the additional registration information corresponding to the stored sheet can be displayed in the selectable manner.

In addition, in the image forming apparatus 100, the acquisition function is switched between valid and invalid according to a user operation. Thus, it becomes possible to avoid an increase of selection targets despite a user's will as compared to a configuration in which both the first sheet attribute information and the second sheet attribute information are constantly displayed in the selectable manner when determined that the size of the stored sheet corresponds to one of the standard sizes.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet processing apparatus, comprising:

a sheet storing portion that stores sheets;

a sensing processing portion that senses a length of a stored sheet stored in the sheet storing portion in a sheet conveying direction and a length of the stored sheet in a sheet width direction orthogonal to the sheet conveying direction;

a determination processing portion that determines whether a size of the stored sheet corresponds to any of a plurality of predetermined standard sizes based on a result of the sensing by the sensing processing portion;

an acquisition processing portion that acquires, when the determination processing portion determines that the size of the stored sheet corresponds to one of the standard sizes, first sheet attribute information narrowed down from sheet attribute information that is predetermined for each type of the sheets and in which a size out of attributes of the sheets is expressed by any of the standard sizes or a combination of the length in the sheet conveying direction and the length in the sheet width direction, the first sheet attribute information being narrowed down based on the standard size that is determined as corresponding by the determination processing portion, and acquires, when the determination processing portion determines that the size of the stored sheet does not correspond to any of the standard sizes, second sheet attribute information narrowed down from the sheet attribute information based on the result of the sensing by the sensing processing portion;

an acceptance processing portion that outputs the sheet attribute information acquired by the acquisition processing portion and accepts a selection operation of selecting any of the sheet attribute information;

a setting processing portion that sets a processing condition of the stored sheet based on the sheet attribute information selected by the selection operation; and a switch processing portion that switches, according to a predetermined switch operation, an acquisition function of the acquisition processing portion to acquire the second sheet attribute information when the size of the stored sheet is determined to correspond to one of the standard sizes, between valid and invalid, wherein the acquisition processing portion is capable of acquiring the second sheet attribute information together with the first sheet attribute information when the determination processing portion determines that the size of the stored sheet corresponds to one of the standard sizes, and when the determination processing portion determines that the size of the stored sheet corresponds to one of the standard sizes, the acquisition processing portion acquires the second sheet attribute information in a case where the acquisition function is valid and does not acquire the second sheet attribute information in a case where the acquisition function is invalid.

2. The sheet processing apparatus according to claim 1, further comprising an image forming portion that forms an image on the stored sheet conveyed along the sheet conveying direction, wherein the processing condition includes either one or both of a conveying condition of the stored sheet and an image forming condition with respect to the stored sheet.

3. A processing condition setting method that is executed by a sheet processing apparatus including a sheet storing portion that stores sheets, comprising:

a sensing step of sensing a length of a stored sheet stored in the sheet storing portion in a sheet conveying direction and a length of the stored sheet in a sheet width direction orthogonal to the sheet conveying direction;

a determination step of determining whether a size of the stored sheet corresponds to any of a plurality of predetermined standard sizes based on a result of the sensing in the sensing step;

an acquisition step of acquiring, when it is determined in the determination step that the size of the stored sheet corresponds to one of the standard sizes, first sheet attribute information narrowed down from sheet attribute information that is predetermined for each type of the sheets and in which a size out of attributes of the sheets is expressed by any of the standard sizes or a combination of the length in the sheet conveying direction and the length in the sheet width direction, the first sheet attribute information being narrowed down based on the standard size that is determined as corresponding in the determination step, and acquiring, when it is determined in the determination step that the size of the stored sheet does not correspond to any of the standard sizes, second sheet attribute information narrowed down from the sheet attribute information based on the result of the sensing in the sensing step;

an acceptance step of outputting the sheet attribute information acquired in the acquisition step and accepting a selection operation of selecting any of the sheet attribute information;

a setting step of setting a processing condition of the stored sheet based on the sheet attribute information selected by the selection operation; and a switch step of switching, according to a predetermined switch operation, an acquisition function of the acquisition step to acquire the second sheet attribute information when the size of the stored sheet is determined to correspond to one of the standard sizes, between valid and invalid, wherein the acquisition step is capable of acquiring the second sheet attribute information together with the first sheet attribute information when the determination step determines that the size of the stored sheet corresponds to one of the standard sizes, and when the determination step determines that the size of the stored sheet corresponds to one of the standard sizes, the acquisition step acquires the second sheet attribute information in a case where the acquisition function is valid and does not acquire the second sheet attribute information in a case where the acquisition function is invalid.

* * * * *